United States Patent [19]

Kurfman et al.

[11] 4,211,822
[45] Jul. 8, 1980

[54] HIGHLY REFLECTIVE MULTILAYER METAL/POLYMER COMPOSITES

[75] Inventors: Virgil B. Kurfman, Midland; Raymond E. Gransden, Jr., Beaverton, both of Mich.

[73] Assignee: The Dow Chemical Company, Midland, Mich.

[21] Appl. No.: 858,592

[22] Filed: Dec. 8, 1977

Related U.S. Application Data

[63] Continuation-in-part of Ser. No. 757,706, Jan. 7, 1977, Pat. No. 4,115,619.

[51] Int. Cl.$^2$ .......................... B32B 5/00; B32B 15/08
[52] U.S. Cl. .................................... 428/412; 75/134 B; 428/418; 428/450; 428/457; 428/458; 428/461; 428/462; 428/463; 428/464; 428/465; 428/468
[58] Field of Search ............... 428/412, 457, 458, 461, 428/462, 463, 425, 421, 418, 422, 437, 460, 474, 479, 336, 332, 335, 450, 464, 465, 468; 75/134 B, 134 D, 134 T, 175 R, 175 A

[56] References Cited

U.S. PATENT DOCUMENTS

| | | | |
|---|---|---|---|
| 3,011,383 | 12/1961 | Sylvester et al. | 428/458 X |
| 3,138,517 | 6/1964 | Charbonneau | 428/458 X |
| 3,382,136 | 5/1968 | Bugel et al. | 428/461 X |
| 3,495,972 | 2/1970 | Baum | 75/134 T X |
| 3,578,552 | 5/1971 | Prevorsek et al. | 428/458 |
| 3,589,975 | 6/1971 | Andrews et al. | 428/458 |
| 3,616,099 | 10/1971 | Shanok et al. | 428/192 X |
| 3,703,571 | 11/1972 | Roberts | 264/45 |
| 3,751,288 | 8/1973 | Alfrey, Jr. et al. | 427/331 |
| 3,776,805 | 12/1973 | Hansen | 428/458 X |
| 3,839,129 | 10/1974 | Neumann | 428/458 |
| 3,939,024 | 2/1976 | Hoggatt | 428/457 |
| 3,949,139 | 4/1976 | Dunning et al. | 428/457 |
| 3,997,703 | 12/1976 | Nakashio et al. | 428/457 |

*Primary Examiner*—Lorraine T. Kendell
*Attorney, Agent, or Firm*—Michael S. Jenkins

[57] ABSTRACT

A multilayer, metal/organic polymer composite exhibiting high specular reflectivity even after substantial elongation is provided by metallizing a layer of thermoplastic organic polymer such as polystyrene or polycarbonate film with a normally solid soft metal such as indium or an alloy of tin and cadmium. Subsequently the multilayer composite or at least a portion thereof can be stretched or elongated by more than 10 percent in both the longitudinal and traverse directions without losing its initial specular reflectivity. Articles fabricated of the multilayer composite may be structurally reinforced by casting an elastomeric or rigid foam polymer such as polyurethane into a cavity defined by the composite. The multilayer composites are useful in the manufacture of reflective and decorative parts for automobiles and other vehicles of transportation, as well as high barrier packages for foods and electroconductive elements.

13 Claims, 1 Drawing Figure

HIGHLY REFLECTIVE MULTILAYER METAL/POLYMER COMPOSITES

CROSS-REFERENCE TO RELATED APPLICATION

This application is a continuation-in-part of our copending application Ser. No. 757,706, filed Jan. 7, 1977, now U. S. Pat. No. 4,115,619.

BACKGROUND OF THE INVENTION

This invention relates to multilayer composites having at least one metal layer and at least one layer of thermoplastic organic polymer and to articles formed therefrom.

Metallized plastic articles prepared by applying a metal to a plastic material by vacuum deposition, electrolytic or electroless deposition, foil lamination or similar metallizing techniques are well known. Such articles are widely employed for decorative purposes, particularly the metallized films which are quite flexible and can be shaped to some extent to conform to various contours.

Unfortunately, the degree to which such conventional metallized films or sheets or other articles can be shaped without rupture and/or separation of the metal from the polymer is generally limited to those shaping procedures involving localized dimensional changes of less than 25 percent in one direction and less than 20 percent (based on area of the film) if the dimensional changes are in two directions. The visual effect of stretching the metallized polymer beyond this limit is a noticeable loss of specular reflectance at the points of excessive elongation. The resulting article has a marred appearance and diminished utility in decorative, electrical and packaging applications.

As a result of the loss of barrier properties caused by actually stretching the metallized polymer beyond the 20 percent limit, the use of such metallized polymers in many packaging applications is severely reduced, particularly where high barrier to vapor transmission is critical. Likewise, the corresponding loss of electrical conductivity reduces the suitable electrical applications to those involving minimal dimensional change.

In addition, the aforementioned limitation on the amount of dimensional change of the metallized polymers significantly hinders their use in the manufacture of reflective parts (often called bright work) for automobiles and other vehicles of transportation as well as for household appliances. Such reflective parts often require biaxial extension such that the stretched article occupies an area more than 50 percent greater than the area of the article prior to stretching.

In view of the aforementioned needs for novel highly extendable, multilayer metal/polymer composites and the deficiencies of existing metallized polymer articles in this regard, it would be highly desirable to provide a multilayer, metal/organic polymer composite that exhibits excellent specular reflectance, electroconductivity and barrier to vapor transmission after substantial dimensional change.

SUMMARY OF THE INVENTION

In one aspect the present invention is a formed, multilayer metal/organic polymer composite exhibiting the aforementioned desirable characteristics even though at least a portion of the composite has been formed such that the portion undergoes a cumulative surface dimensional change of at least 20 percent. More specifically, the formed, multilayer composite comprises a normally solid, thermoplastic organic polymer layer having adhered thereto a normally solid, soft metal layer. By "formed multilayer composite" is meant the composite has been formed such that at least a portion undergoes the aforementioned dimensional change, preferably by extending at least a portion of the multilayer composite to an area that is at least 30 percent greater than the area of the portion before forming, without rupturing either the metal layer or the polymer layer. In this instance, it is understood that the presence of pinholes, i.e., those having average diameter less than 1 micrometer, which are often formed during metallizing and/or the extension process can be tolerated. Such pinholes do not noticeably reduce specular brightness, electroconductivity or barrier. Generally, a metal or an alloy of metals will be considered a soft metal for the purposes of this invention if it melts at a temperature or over a range of temperatures that is from about 80 to about 135 percent of the temperature used in forming the composite, said temperatures being in °K.

In another aspect, this invention is a multilayer metal/organic polymer composite comprising a normally solid, thermoplastic organic polymer layer having adhered thereto a normally solid, soft metal layer wherein the metal layer comprises an alloy containing at least 50 weight percent of at least one metal and at least 5 weight percent of at least one other metal, said metals having a melting point below 450° C. (723° K). This composite is capable of being converted to a formed composite as described herein.

In yet another aspect, this invention is a shaped article comprising (1) the aforementioned formed composite and (2) a reinforcing material in intimate contact with at least one surface of the formed composite.

Surprisingly, the formed multilayer composite of this invention exhibits specular brightness, barrier and/or electrical continuity that are nearly the same as those of the composite prior to forming. In fact, the metal composites of this invention exhibit electrical resistivities less than 100 ohms/square even after forming, preferably less than 10 ohms/square. In contrast, the metal/polymer composites conventional to the art exhibit electrical resistivities greater than 1000 ohms/square after similar forming. Moreover, the metal layer of the formed composite remains strongly adhered to the polymer layer even though forming was carried out at temperatures at which most of the metal is in the melted or liquidus state and the polymer layer is heat plastified or nearly so.

As a result of this surprising capability the multilayer composites are usefully formed into articles such as bumpers and other reflective parts for automobiles and other vehicles of transportation, housings and decorative parts for appliances and the like with minimal, if any loss, of brightness, barrier and electroconductivity. In addition, these formed composites are usefully employed in electrical applications and as plastic containers exhibiting a high degree of barrier to atmospheric gases. Particularly surprising is the fact that multilayer composites of this invention, wherein the polymer layer is polyolefin, exhibit a barrier to oxygen superior to that of conventional metal/polyolefin composites wherein the metal layer is aluminum, silver or copper. For purposes of this invention, "high barrier" means that the formed composite exhibits a permeance to atmospheric gases essentially equivalent to metal foil/polymer laminate films, e.g., an oxygen transmission rate less than about 0.1 cc through a 1 mil thick film having an area of 100 square inches were exposed to a pressure difference of 1 atmosphere at a temperature of 25° C. (298° K.) over a 24 hour period (hereinafter abbreviated cc/100 in$^2$ (645 cm$^2$)/mil/day/atm). Because the formed composites of this invention can withstand wet environments, they are especially desirable for the packaging of oxygen-sensitive wet foods such as applesauce, fruit, and catsup as well as dry food such as coffee, potato chips and the like.

DETAILED DESCRIPTION OF THE EMBODIMENTS

Figure 1:
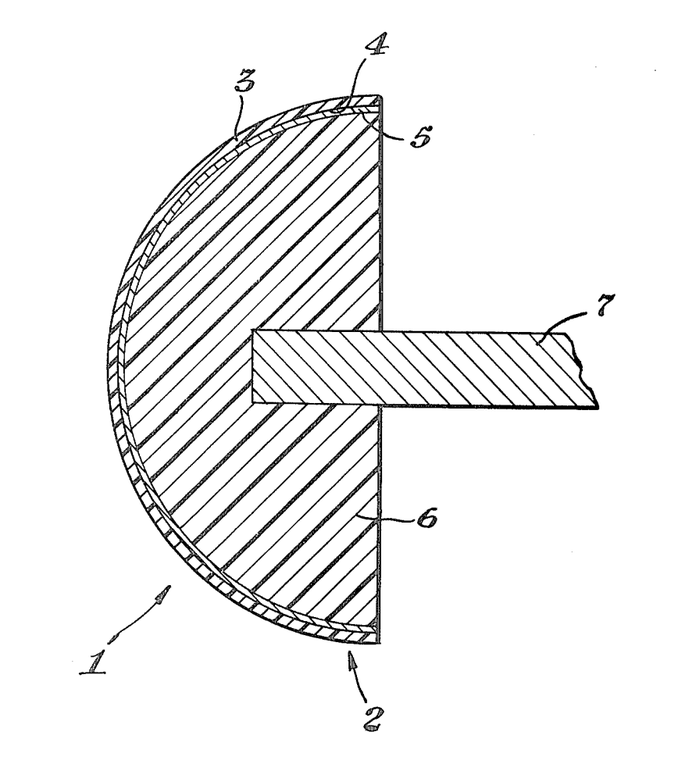
The FIGURE is a side view in cross-section of a preferred shaped article of the invention.

In the FIGURE there is depicted a preferred shaped article 1 having a shell 2 of a formed, multilayer metal-/organic polymer composite. The outer layer 3 of the shell 2 comprises a normally solid, thermoplastic polymer and has a surface 4 to which is intimately bonded a layer 5 of a soft metal. The shell 2 defines a cavity 6 which is filled in part with a polymeric filler material which may be either foamed or nonfoamed, rigid or flexible, and elastomeric or non-elastomeric. Embedded in the polymeric filler material is a mounting strut 7 for affixing the shaped article to a substrate as desired.

Polymers suitably employed in the polymer layer(s) of the multilayer composites of this invention are those normally solid, organic, formable thermoplastic polymers that are readily shaped or molded or otherwise fabricated into desired forms. By the term "formable" is meant that the polymer can be stretched or otherwise extended without rupturing to occupy an area which is at least 30 percent greater than its original area, preferably more than 100 percent and most preferably more than 150 percent. The term "thermoplastic" as used herein is intended to include all synthetic resins that may be softened by heat and then regain their original properties upon cooling. Also included within this term are thermosetting resins in the B stage, i.e., that stage prior to crosslinking wherein the resin exhibits the heat plastification characteristics of a thermoplastic resin. In some preferred embodiments, the thermoplastic polymers are also generally transparent.

Because of their lower cost and superior structural properties, polymers of particular interest in the practice of this invention include engineering plastics such as polystyrene, styrene/acrylonitrile copolymers, copolymers containing polymerized styrene, acrylonitrile and butadiene (often called ABS polymers), styrene/-butadiene copolymers, rubber modified styrene polymers, styrene/maleic anhydride copolymers and similar polymers of monovinylidene aromatic carbocyclic monomers; polycarbonates including those made from phosgene and bisphenol A and/or phenolphthalein; polyesters such as polyethylene terephthalate; acrylic resins such as poly(methyl methacrylate); polyacetyl resins such as polyformaldehyde resin; nitrile resins such as polyacrylonitrile and other polymers of $\alpha,\beta$-ethylenically unsaturated nitriles such as acrylonitrile/-methyl methacrylate copolymers; polyamides such as nylon; polyolefins such as polyethylene and polypropylene; polyvinyl halides such as polyvinylchloride and vinylidene chloride homopolymers and copolymers; polyurethanes; polyallomers; polyphenylene oxides; polymers of fluorinated olefins such as polytetrafluoroethylene; and other normally solid polymers which can be formed while in the solid state into the desired shape by conventional forming techniques, e.g., cold drawing, vacuum drawing, drape molding, pressure thermoforming, scraples thermoforming procedures and the like. Especially preferred, particularly for polymer layers which must exhibit significant abrasion resistance as well as a high degree of transparency are the polycarbonates, particularly those derived from the bis(4-hydroxyphenol)alkylidenes (often called bisphenol A types) and those derived from the combination of such bisphenol A type diols with phenolphthalein type diols. It is understood that the polymer layer of the multilayered composite may also contain one or more additaments such as dyes, light stabilizers, reinforcement fillers and fibers, pigments, carbon black and the like.

The thickness of the polymer layer(s) of the multilayer composite is not particularly critical. Therefore, the polymer layer is of suitable thickness if it can be formed into a continuous layer which will have the necessary strength to survive the conditions normal to its intended use. Accordingly, such properties will often be abrasion resistance, corrosion resistance, tensile or impact strength and other physical properties which will be evident to those skilled in the art of fabricating polymers and metallized polymers. Usually, the thickness of the polymer layer(s) is in the range from about 2 to about 10,000 micrometers, preferably from about 10 to about 500 micrometers.

The metal layer(s) of the multilayer composite which imparts specular reflectance, as well as high barrier and electroconductivity when such are desired, preferably comprises a metal or an alloy of two or more metals that melts at a temperature or over a range of temperatures that is from about 80 to about 135 percent of the maximum temperature reached by the metal composite during forming, said temperatures being in ° K. Preferably, the metal or alloy of metals melts at a temperature or over a range of temperatures that is from about 90 to about 110 percent of the forming temperature. In preferred embodiments, the metal or alloy has a liquidus temperature ($T_l$-temperature in ° K. at which the metal or alloy is entirely liquid) and a solidus temperature ($T_s$-temperature in ° K. at which the metal or alloy just begins to liquefy) which are within the temperature range of 0.85 $T_f$ to 1.35 $T_f$ wherein $T_f$ is the temperature in ° K. at which the composite is formed.

Typically, such preferred metal alloys can be further characterized as containing at least 50 weight percent, more advantageously from about 60 to about 87 weight percent, of at least one metal having a melting point below 450° C. (723° K.) and at least 5 weight percent, most advantageously from about 10 to about 47 weight percent, of at least one other metal also having a melting point below 450° C. (723° K.). Especially preferred are alloys similar to the preceding preferred metal alloys which additionally contain at least 0.1 weight percent, most advantageously from about 3 to about 20 weight percent, of a metal having a melting point above 450° C. (723° K.).

An example of a suitable metal is indium, whereas alloys of any two or more of the following metals may be employed: cadmium, indium, tin, antimony, zinc, lead, bismuth, and silver. In addition, other metals may be present in the alloys so long as the melting range of the alloy is within the prescribed range of 80 to 135 percent of the forming temperature. Representative of such alloys are those containing at least 50 weight percent of one or more of antimony, indium, bismuth, tin, zinc, cadmium and lead; from 0 to about 10 weight percent of one of more metals such as manganese, nickel, iron, and other metals having melting points greater than 1100° C. (1373° K.); and a remaining amount of one or more of silver, copper, gold, aluminum and magnesium. Of special interest are alloys having a solidus temperature less than 650° K., preferably less than 548° K., and containing at least 60 weight percent of at least one of indium, bismuth, tin, zinc, cadmium, antimony and lead and not more than 95, preferably not more than 90 and most preferably not more than 80, weight percent of any one metal.

Illustrative preferred alloys contain at least 5 weight percent of at least two of the following metals: tin, bismuth, lead, zinc, cadmium and antimony. Examples of preferred alloys are in the following alloys comprising metals in the indicated weight percentages: alloy(1)- from about 5 to about 95 percent tin, from about 5 to about 95 percent bismuth, and from about 0 to about 40 percent copper; alloy(2)-from about 5 to about 95 percent tin, from about 5 to about 95 percent bismuth and from 0 to 49.9 percent silver; alloy(3)-from about 5 to about 95 percent zinc, from about 5 to about 95 percent cadmium and from 0 to 49.9 percent silver; alloy(4)- from about 5 to about 95 percent zinc, from about 5 to about 95 percent cadmium and 0 to about 10 percent magnesium; alloy(5)-from about 0.1 to about 95 percent tin and from about 5 to about 99.9 percent indium; alloy(6)-from about 5 to about 95 percent tin, from about 5 to about 95 percent lead and from 0 to about 40 percent copper; alloy(7)-from about 5 to about 95 percent tin, from about 5 to about 95 percent lead and 0 to 49.9 percent silver; alloy(8)-from about 5 to about 95 percent tin, from about 5 to about 30 percent antimony and from 0 to 40 percent copper; alloy(9)-from about 40 to about 94 percent tin, from about 3 to about 30 percent antimony, from about 3 to about 57 percent bismuth and from 0 to about 40 percent copper; alloy(10)-from about 90 to about 99.9 weight percent indium and from about 0.1 to 10 weight percent of at least one of copper, silver, gold, nickel, bismuth, tin, zinc, cadmium, antimony and lead; alloy(11)-from about 75 to about 99.9, especially 85 to 98, weight percent of at least one of indium, bismuth, tin, zinc, cadmium, antimony and lead and from about 0.1 to about 25, especially 2 to 15, weight percent of at least one of copper, silver, gold, nickel, magnesium and aluminum, provided that alloy(11) contain no more than 90 weight percent of any one metal. Also preferred are alloys of tin, silver and indium, alloys of zinc, cadmium and indium, alloys of indium and silver, alloys of tin and cadmium, alloys of silver and indium and alloys of magnesium and aluminum. Of the aforementioned alloys, alloys of tin and bismuth are more preferred with alloys of tin, bismuth and copper being most preferred.

It should be understood, however, that preference for the different alloys will vary depending on the end use. For example, alloys of tin and copper, alloys of tin and silver and alloys of tin, bismuth and copper show superior corrosion resistance compared to alloys of zinc and cadmium. Similarly, alloys of tin, bismuth and copper and alloys of tin and copper would be more acceptable in food packaging than would be more toxic alloys of tin and lead.

Moreover it is observed that preference for various alloys will vary with the different polymer layers used in the multilayer composite. For example, it is observed that the alloys of tin and copper, the alloys of tin and silver, the alloys of indium and silver, and alloys of tin, bismuth and copper, and the alloys of zinc and cadmium are preferred when the multilayer composite is to be formed at temperatures from about 25° C. (298° K.) to about 175° C. (448° K.) as in the case when the polymer layer consists essentially of polycarbonate.

In addition, it has been generally observed that the more concentrated alloys, i.e., those containing larger amounts, e.g., more than 20 weight percent (preferably 25 weight percent or more) of the minor components of the alloy, are generally more easily extended than the more dilute alloys, i.e., those containing very substantial amounts of the major component of the alloys and minimal amounts of the minor component or components. For example, an alloy of 75 weight percent tin and 25 weight percent silver is superior in regard to plastic character than an alloy of 90 percent tin and 10 percent silver. Also, an alloy of 50 percent tin and 50 percent indium exhibits extendibility superior to that of an alloy of 90 percent tin and 10 percent indium.

Also it is noted that alloys of tine, bismuth and a higher melting metal such as copper, silver, nickel, magnesium, gold, iron, chromium and manganese, particularly those containing (1) at least 8 weight percent each of tin and bismuth and (2) more bismuth than the higher melting metal, exhibit excellent adhesion and forming characteristics. For example, composites employing these alloys may be formed at temperatures at which the polymer and most of the alloy melt without loss of adhesion or integrity (continuity of the metal layer). These multilayer composites exhibit superior vapor barrier characteristics and may be flexed a number of times without an apparent loss of continuity of the metal layer. Of the alloys of these highly adherent composites, alloys of particular interest consist essentially of from about 25 to about 90, preferably 60–80, weight percent tin; from about 8 to about 60, preferably 8 to 30, most preferably 12 to 25, weight percent bismuth; and from about 1 to about 25, preferably 4 to 12, weight percent of higher melting metal, preferably copper or silver.

Since the normal thermoplastic polymers which will be utilized in the multilayer composites of the present invention are preferably formed at temperatures in the range from about 25° C. (298° K.) to 200° C. (473° K.), preferably 100° C. (373° K.) to 200° C. (473° K.), it will be generally desirable that the metals and metal alloys advantageously employed in the practice of this invention will have melting points or melting point ranges within the range from about 100° C. (373° K.) to about 400° C. (673° K.), preferably from about 130° C. (403° K.) to about 275° C. (548° K.). For the purposes of this invention, the melting point of a metal or the melting range of an alloy of metals is defined as the temperature or range of temperatures at which solid and liquid forms of the metal or alloy are in equilibrium. The alloys typically do not melt entirely at a single temperature but will melt gradually over a fairly wide temperature range.

The multilayer composites of the present invention are suitably prepared by any conventional method for making multilayer metal/organic polymer composites wherein the layers of metal and polymer adhere to each other. For example, the metal may be applied as a coating by a conventional metallization technique such as an electroless process described by F. A. Lowenheim in "Metal Coatings of Plastics", Noyes Date Corporation, (1970), by Pinter, S. H. et al., *Plastics:Surface and Finish*, Daniel Davey & Company, Inc., 172–186 (1971) or in U.S. Pat. No. 2,464,143. An especially preferred metallization technique in the practice of this invention is a vacuum deposition technique wherein the metal is vacuum evaporated and then deposited onto the polymer layer as described by William Goldie in *Metallic Coating of Plastics*, Vol. 1, Electrochemical Publications Limited, Chap. 12 (1968). Another preferred metallization technique includes sputter coating as described in Chapter 13 of Goldie, supra. Also suitable but less preferred metallization techniques include electroplating and ion plating. In addition, the multilayer composite can be formed by lamination of metal foil to the polymer layer including extrusion coating of the polymer layer onto a metal foil.

In the formation of a multilayer composite wherein the polymer layer comprises a fairly polar polymer such as polycarbonate, polyester, polyvinyl halide or polyvinylidene halide, polyvinyl alcohol, acrylic polymers and other known polar polymers, it is generally not necessary to pretreat the polymer layer prior to application of the metal layer. However, when relatively nonpolar polymers, e.g., polystyrene or polyethylene are to be employed, it is often desirable to treat the surface of the polymer layers sufficiently to enhance bonding between the metal and the polymer. Such pretreatments can include gas phase sulfonation as described in U.S. Pat. No. 3,625,751 to Walles and especially the procedure described in Lindblom et al. in U.S. Pat. No. 3,686,018. Other suitable methods for pretreating the polymer include corona discharge, flame treatment, liquid phase sulfonation and the like. Alternatively, the polymer layer may be coated with an adhesive, such as an ethylene/acrylic acid copolymer, an ethylene/vinyl acetate copolymer or similar adhesives, commonly employed in bonding metal layers to relatively nonpolar organic polymer layers.

The quantity or thickness of the metal layer in the multilayer composite is not particularly critical so long as the metal layer forms an essentially continuous film over the desired surface of the polymer layer and thereby provide a highly reflective surface, high barrier to vapor transmission or electroconductivity as the desired end use requires. Preferably, the thickness of the metal layer is in the range from about 0.002 to about 100 micrometers, more preferably from about 0.01 to about 100 micrometers and most preferably from about 0.01 to about 1 micrometer.

While the metal layer may be applied to either or both sides of the polymer layer(s), it is generally desirable to apply the metal layer to only one surface of the polymer layer. Accordingly in a shaped article as shown in the drawing, the polymer layer provides protection against abrasion of the metal layer which would cause degradation of the highly reflective character of the article. It is understood, however, that when the metal layer is applied to the surface of the polymer layer which will be exposed in the final article, such exposed metal layer can be protected by coating with some other adherent material. Examples of such materials suitably employed as protective coatings for the metal layer include polycarbonates such as those derived from bisphenol-A and/or phenolphthalein, polyesters such as polyethylene terephthalate, acrylic polymers such as poly(methyl methacrylate), saran polymers such as vinylidene chloride copolymers, polyepoxides, alkyd resins, polyurethanes and the like. An exemplary method for overcoating the metal layer is described in U.S. Pat. No. 3,916,048 wherein the protective polymer in the form of a latex is applied to the metal layer and dried to form a continuous film at a temperature below the heat distortion point of the polymer layer. By following this technique it is possible to form the metal composite before or after application of the protective coating. In cases wherein high barrier is desirable, it will generally be desirable to overcoat the metal layer with a barrier polymer such as a vinylidene chloride polymer/vinylidene chloride copolymer as described in U.S. Pat. No. 3,916,048 which is hereby incorporated by reference.

Following adherence of the metal layer to the polymer layer, the multilayer composite is formed by a conventional forming process, e.g., thermoforming or solid phase forming, to the desired shape. Preferably, the forming process is a conventional thermoforming process for shaping sheet stock which process is normally carried out at temperatures from about the second order transition temperature (Tg) of the polymer up to and including temperatures at or above the melting point of the polymer provided that the polymer has sufficient melt strength to undergo the forming operation without rupturing. Exemplary thermoforming processes include differential air pressure thermoforming, match dye thermoforming, vacuum forming, plug assist-vacuum forming, draw forming, impact forming, rubber pad forming, hydroforming, drape molding and the like. Since most thermoplastic polymers preferably employed in the practice of this invention have melting points less than 200° C. (473° K.), it is generally advantageous to thermoform the composite at a temperature from about 25° C. (298° K.) to about 200° C. (473° K.), most preferably from about 90° C. (363° K.) to about 180° C. (453° K.). Alternatively, the composite may be formed by solid phase forming which is carried out at temperatures below the melting point of the polymer. Exemplary solid phase forming methods include cold rolling, impact extrusion, forging, forward extrusion, cold heading, and rubber-pad forming, e.g., as such methods are further described by P. M. Coffman in *Soc. Plas. Eng. Journal*, Vol. 25, Jan., 1969 (50–54) and *Soc. Auto. Eng. Journal*, Vol. 76, No. 6, 36–41 (1968).

In the forming operation performed herein, the entire composite or a portion thereof is formed or shaped in a manner such that at least a portion of the composite undergoes a cumulative surface dimensional change of at least 20 percent, advantageously at least 30 percent. By cumulative surface dimensional change is meant the combined change of length and width wherein a decrease as well as an increase in a particular dimension is treated as a positive change. Further, only one or both surface dimensions may be changed in the forming operation. Techniques for observing surface dimensional changes are described by A. Nadai in *Plasticity*, McGraw-Hill (1931). Preferably, the composite or a portion thereof is extended (stretched) to an area which is at least 30 percent greater than its original area, more preferably from about 50 to about 300 percent, most preferably from about 150 to about 300 percent. When only a portion of the composite is extended, it is that portion being extended which undergoes the aforementioned increase in area. An example of such portion extension or stretching is in the forming of an automobile bumper, a rimmed cup, blister package, and certain reflectors. While the portion may be as small as 1 mm$^2$, it is usually larger than 1 cm$^2$ and preferably greater than 50 cm$^2$. The actual degree of extension, of course, will vary with the intended end use.

Following the forming operation, the formed composite may be utilized without further fabrication, as is the case for most packaging and electroconductive applications. In these applications the formed multilayer composite can be used as tubs or similar deep drawn containers for various oxygen sensitive foods as described herein, as packaging films, as printed circuit stock for electrical and electronic equipment, and the like. In such applications, if the metal layer is not protected on both sides by the polymer layer and/or a protective polymer coating layer as described hereinbefore, it is desirable to coat the metal layer with a protective coating as described hereinbefore.

In addition to the foregoing uses, a formed composite generally defining a cavity as shown in the drawing is reinforced by filling the enclosed or partially enclosed cavity with a reinforcing material. Alternatively, the reinforcing material may be adhered to the surface of the composite outermost from the cavity or concave shape as in the case of the reflector for an automobile headlamp. The type of reinforcing material employed is not particularly critical. For example, the material may be metal such as steel, wood, stone, concrete and plastic, with plastic materials comprising natural and/or synthetic organic polymers being preferred. The reinforcing polymeric filler materials of particular interest may be foamed or nonfoamed, rigid or flexible, elastomeric or non-elastomeric. They may be pure (non-filled) or filled with pigments, stabilizers, reinforcing fibers such as glass fibers, fillers and the like. They may be blends of polymers which may contain crosslinking components.

Examples of suitable rigid polymeric materials include polyurethane, polystyrene, epoxy polymers, polyvinyl chloride, vinylac resin, silicone polymers, cellulosic polymers, acrylic polymers, saturated polyesters and unsaturated polyesters, asphalt and the like. Of these materials the polyurethanes are generally preferred. Additional examples of such rigid materials, particularly in the form of foams and methods for preparing the same, are more completely described in U.S. Pat. No. 3,703,571. The rigid polymers and rigid polymer foams are particularly useful in the fabrication of articles which are not exposed to significant amounts of impact.

In the production of articles such as bumpers and external trim for automobiles and other vehicles of transportation that are exposed to impact, it is desirable to employ an elastomeric polymer, preferably in the form of a foam, as the reinforcing material. Examples of such elastomeric polymers include elastomeric polyurethanes, rubbery styrene/butadiene copolymers, polybutadiene rubber, natural rubber, ethylene polymers, particularly ethylene/propylene copolymer rubber, and the like. Such elastomeric polymers, whether solid or foamed, and methods for their preparation are well known to those skilled in the art and therefore will not be discussed in greater detail here. Other suitable reinforcing polymeric materials include polyethylene foam, chlorinated polyethylene and blends of two or more of the aforementioned reinforcing materials.

The reinforcing material is readily cast onto the shaped multilayered composite by any of a wide variety of casting techniques. For example, a reinforcing material may be applied by foamed-in-place or pour-in-place techniques as well as spray applications, slush castings or rotational casting application. Exemplary methods are described in more detail in U.S. Pat. No. 3,414,456. It is desirable that the conditions of the casting technique be employed such that the formed composite does not deform during casting, foaming, and/or curing steps which may be employed. However, if such deforming conditions are employed at this time, a support mold for the thermoformed composite is required.

The following examples are given to illustrate some specific embodiments of the invention and should not be construed as limiting the scope thereof. In the following examples, all parts and percentages are by weight unless otherwise indicated.

EXAMPLE 1

Metallization

A rectangular section (27.94 cm × 12.7 cm) of polystyrene film having a thickness of 127 micrometers and sulfonated to a degree sufficient to render the polystyrene water wettable is washed with distilled water and dried at 60° C. for approximately one-half hour. A tungsten wire basket situated in a vacuumizable bell jar and electrically attached to a filament control of 5 kilovolt electron beam power supply is loaded with an indium pellet (0.1 g) and the dried polystyrene film is placed in the jar above the filament. The film is configured to the shape of the partial cylinder having a radius of about 12.7 cm by taping the film to a rigid metal sheet of that configuration. The configured film is positioned in the bell jar space such that the axis of the cylinder is proximate to the filament in order to achieve a fairly uniform thickness of the metal to be deposited. The bell jar is closed and the system is evacuated to a pressure of $3 \times 10^{-5}$ mm Hg. The electrical current to the filament is turned on and adjusted to a nominal current of 0.8 amps and maintained there for 30 seconds and then turned off for 1 minute. The same cycle is repeated and subsequently the bell jar is opened to atmospheric pressure.

Thermoforming

The metallized polystyrene film (wherein the metal layer has a thickness of approximately 0.2 micrometer) is cut into a segment of approximately 12.7 cm × 12.7 cm. The segment is clamped into a thermal forming cup mold having a chamber diameter of 9.5 cm and a mold temperature of 93.3° C. (366.3° K.). Air is supplied through a connecting air line to the side of the mold facing the metallic layer of the film in an amount sufficient to apply a load of 15 psig (2.09 Kg/cm$^2$). As a result, the sample is drawn to a depth of 2.14 centimeters and withdrawn from the mold. The thermoformed sample is observed to have a brilliant, highly reflective surface when viewed through the polystyrene film layer. The surface is electrically conductive from the edge of the thermoformed metallized film to the center.

Comparative Sample

For purposes of comparison, a second, similar strip of polystyrene film is metallized in the manner described hereinbefore except that aluminum is substituted for the indium and the deposition conditions are changed to 1 amp for 1.25 minutes. The resulting metallized film is molded by the drawing procedures set forth hereinbefore except that an air pressure of only 11 psig is employed to produce significantly less stretching such that the total depth of the molded article is only 1.9 centimeters. The resulting sample is not brilliantly reflective and actually exhibits rather diffused reflection. This sample also did not exhibit electroconductivity from the edge to the center of the sample.

EXAMPLE 2

A rectangular section (33.02 cm×55.88 cm) of polycarbonate film wherein the polycarbonate is derived from bisphenol A and phosgene and the film has a thickness of 127 micrometers is placed in a bell jar equipped as in Example 1. A 0.5-g pellet of an alloy of 50 percent tin, 30 percent bismuth and 20 percent copper is evaporated from the tungsten wire basket onto the polycarbonate film. The electrical current to the basket is controlled so that complete evaporation of the alloy occurs in two minutes. A segment (12.7 cm×12.7 cm) of the metallized polycarbonate film is cut from the sample and clamped into a thermoforming mold having a mold temperature of 137.8° C. (410.8° K.). Air is supplied to the metal layer surface at sufficient pressure to apply a load of 15 psig (2.09 Kg/cm$^2$). A sample is thereby thermoformed to a depth of 2.5 centimeters and then withdrawn from the mold. The sample is observed to have a brilliant, highly reflective surface when viewed through the polycarbonate film. The metallic surface is electrically conductive from the edge of the sample to the center of the sample.

In accordance with the foregoing procedure of this example, several other alloys included within the scope of this invention are deposited on the polycarbonate film and subsequently thermoformed into cup-like structures that have brilliant, highly reflective surfaces when viewed through the polycarbonate film and are electrically conductive from the edge to center. These alloys are as follows: 0.7 gram of an alloy of 80 percent tin, 15 percent bismuth and 5 percent copper; 0.6 gram of an alloy of 75 percent tin, 20 percent bismuth and 5 percent silver; 0.6 gram of an alloy of 75 percent tin and 25 percent silver; and 0.7 gram of an alloy of 75 percent tin and 25 percent lead.

For purposes of comparison, other metals and alloys outside the scope of this invention are similarly deposited on polycarbonate film and subsequently thermoformed into cup-like structures which exhibited a loss of electrical conductivity in specular reflectance. These metals and alloys include stainless steel, an alloy of 50 percent tin and 50 percent copper, an alloy of 85 percent aluminum and 15 percent magnesium, and metals such as aluminum, tin, copper, silver and chromium which are deposited separately on the polycarbonate.

While it is observed that the alloys of tin and bismuth, alloys of zinc and cadmium, and alloys of tin and lead sometimes exhibited a moderate loss of specular reflectance and electroconductivity when applied to polycarbonate film and thermoformed at temperatures of 137.8° C. (410.8° K.), such moderate losses of reflectance and of electrical conductivity are avoided by incorporating a small percentage (preferably from about 2 to about 10 percent) of silver, copper and/or one or more other metals melting above 450° C. (723° K.) in the alloy or by depositing a very thin coat (<50 Å) of silver or other higher melting (<450° C.) (<723° K.) metal or metal alloy on the polycarbonate film prior to deposition of the alloy.

As an example of such a modified metallization technique, an 0.01-g pellet of silver is deposited on a polycarbonate film by the vacuum metallization technique and then a 0.5-g pellet of an alloy of 50 percent zinc, and 50 percent cadmium is deposited on the silver polycarbonate film. When the resultant metallized film is thermoformed by the aforementioned procedure to produce a cup having a depth of 3.5 centimeters, the resultant cup is highly reflective and electroconductive.

EXAMPLE 3

A thermoformable, amorphous polyethylene terephthalate film (polyester film) having a thickness of about 25 micrometers is surface activated by passing the film through a flame in accordance with a conventional flame treatment technique. A 1.2-g pellet of an alloy of 55 percent tin, 35 percent bismuth and 10 percent silver is deposited on the flame-treated surface of the polyester film in accordance with the vacuum deposition technique set forth in the preceding examples. The metallized film is then thermoformed into a cup-like structure at a mold temperature of 77° C. (350° K.). The resulting molded part is highly reflective and electroconductive.

EXAMPLE 4

A polystyrene film having a thickness of about 13 micrometers is flame treated as in the preceding example and the sample is placed in the bell jar which is evacuated. The evacuated jar is backfilled with a small amount of argon gas and a highly negative voltage charge is applied to one connection of the filament basket, the other connection being open and the base plate of the vacuum system being grounded. This application of highly negative voltage set up a glow discharge current of 10 milliamps at 0.7 kilovolts and an argon pressure of 0.1 mm Hg. This glow discharge is continued for about 1 minute, and the high voltage is then disconnected. A 0.4-g pellet of indium is then vacuum deposited on the treated polystyrene film by the aforementioned vacuum depositing procedure.

A segment (12.7 cm×12.7 cm) of the metallized polystyrene sample is coated with a latex of a vinylidene chloride/acrylonitrile/sulfoethyl methacrylate (90/8/2) terpolymer by applying a 50 percent solids latex of the terpolymer to the metal layer to produce a film having a wet thickness of about 5 micrometers. The latex film is dried for 2 hours at 65° C. (338° K.) and the resulting dried metallized composite is subsequently thermoformed to a cup having a depth of 3 centimeters. The metal layer is highly reflective and visually continuous. The thermoformed composite when tested for barrier exhibits an oxygen transmission rate of 0.02 cc/100 in$^2$ (645 cm$^2$)/24 hours/atm at 25° C. (298° K.). Oxygen transmission rate is determined according to the dynamic gas chromatographic method reported by T. L. Caskey in *Modern Plastics,* December, 1967.

A similar polystyrene film metallized with aluminum, coated with the terpolymer latex and thermoformed to a cup depth of 2.5 centimeters is observed to have a visually discontinuous metal film and an oxygen transmission rate of greater than 5 cc/100 in$^2$ (645 cm$^2$)/24 hours/atm.

EXAMPLE 5

A section (12.7 cm×12.7 cm) of the polycarbonate film of Example 2 is placed on a steel plate. Fifty grams of indium is melted in a crucible and the molten metal is poured onto the polycarbonate film to provide a coating thickness of about 0.158 centimeter over a 7.62 cm diameter circular portion of the section of polycarbonate film. The resulting metal/polymer composite is thermoformed by the procedure of the foregoing examples to produce a cup having a depth of 2 centimeters. The cup is observed to have a brilliant reflective surface when viewed through the polycarbonate film and is electrically conductive from the edge to the center of the thermoformed cup.

In the foregoing examples, thermoforming the composites to a cup depth of 2 centimeters is comparable to a biaxial stretching sufficient to increase the area of the thermoformed cup to 40 percent greater than the metallized film prior to thermoforming.

EXAMPLE 6

Following the procedure of Example 2, a bilayer composite is prepared using the polycarbonate film of Example 2 and an alloy of 50 percent tin, 30 percent bismuth and 20 percent copper. A portion (2.54 cm×15.24 cm) of the bilayer composite is tested for adhesion by application and removal of a (1.91 cm×5.08 cm) portion of pressure sensitive adhesive tape from the alloy layer (1,000 Å thickness). No removal of the alloy layer is observed.

For purposes of comparison, another portion of the polycarbonate film is coated with aluminum using a similar procedure. Upon testing the aluminized film (having an aluminum layer thickness of 1,000 Å) for adhesion in the foregoing manner, the metal appears to be completely removed in the region contacted by the tape.

EXAMPLE 7

Another portion (2.54 cm×15.24 cm) of the alloy coated film of Example 6 is heated to 130° C. (403° K.) for 5 minutes. The metal film is then scribed with a razor blade and a pressure sensitive adhesive tape is applied to cover a portion of the scribe marks. A drop of water is applied to the metal tape interface so as to wet the exposed (non-taped) scribe marks. The sample is soaked in this manner for about one minute, and the tape is then slowly pulled off the sample. No removal of alloy is observed.

For purposes of comparison, a portion of the aluminized polycarbonate from the comparative sample of Example 6 is heated according to the procedure of Example 7. The sample is scribed, tape tested and wetted with water according to the procedure of Example 7. Upon removal of the tape, the aluminum coating is peeled cleanly from the polycarbonate film.

EXAMPLE 8

Following Examples 6 and 7 except that a polyethylene terephthalate film is substituted for the polycarbonate film, alloy/polymer composites and aluminum/polymer composites are prepared and tested for adhesion as in Examples 6 and 7. The alloy/polymer composites passed both tests whereas the aluminum polymer composites failed both tests.

EXAMPLE 9

Following Examples 6 and 7 except that an alloy of 75 percent tin and 25 percent silver is substituted for the alloy used in Examples 6 and 7, an alloy/polycarbonate composite is prepared and tested for adhesion. The composite passed both tests.

When the polycarbonate film is metallized with tin, silver or an alloy, 99 percent tin and 1 percent silver and tested for adhesion as in Examples 6 and 7, the metallized composites failed the adhesion tests.

EXAMPLE 10

Following the procedure of Example 2, a portion (15.24 cm×60.96 cm) of polyethylene film is coated with about 0.2 g of an alloy of 80 percent tin, 14 percent bismuth and 6 percent copper. When a (15.24 cm×15.24 cm) portion is tested for barrier to oxygen, it exhibits an oxygen transmission rate of ~1.8 cc/24 hrs.

Similar results are obtained when polyethylene film or other polymer film such as saran film is metallized with other alloys of from 25 to 95 percent tin, 5 to 75 percent of at least one of bismuth, antimony, zinc and lead and up to 25 percent of at least one of copper, silver and nickel.

When a similar polyethylene film portion coated with aluminum is similarly tested for oxygen barrier, an oxygen transmission rate of ~36 cc/24 hrs is observed. The uncoated polyethylene film exhibits an oxygen transmission rate of ~180 cc/24 hrs.

EXAMPLE 11

Following the procedure of Example 2, a bilayer composite is prepared using the polycarbonate film of Example 2 and an alloy of 84 percent tin, 12 percent bismuth and 4 percent copper. A sample (12.7 cm×12.7 cm) of this composite is tested for electrical resistance (ER) by attaching two electrical contacts to the sample and ER is found to be 0.7 ohm/square. The sample is shaped into a cup to a depth of 2 cm as in Example 2, and the ER is again measured by attaching the electrical contacts to the sample in the formed area. The ER is found to be 1 ohm/square.

For purposes of comparison, a bilayer composite is prepared as in Example 11 except that aluminum is substituted for the metal alloy. As in Example 11, a sample (12.7 cm×12.7 cm) of the aluminum composite is tested for ER, formed into a cup shape and retested for ER. The results of these tests are as follows: ER before forming is 0.7 ohm/square, ER after forming is >1000 ohms/square. Results similar to those obtained for the aluminum composite are obtained if silver is substituted for aluminum in preparing and testing a bilayer composite by the procedure of Example 11.

What is claimed is:

1. A formed metal/organic polymer composite comprising a normally solid thermoplastic polymer layer and a normally solid, soft metal layer adhered to at least one surface of the polymer layer, at least a portion of said formed composite having been modified during forming such that the portion undergoes a cumulative surface dimensional change of at least 20 percent, without rupturing the metal layer or the polymer layer, said soft metal being a metal or an alloy of two or more metals that melts at a temperature or over a range of temperatures that is from about 80 to about 135 percent of the temperature used in forming, said temperatures being in °K.

2. The composite of claim 1 wherein the thermoplastic polymer is a polycarbonate, a polyester, or a monovinylidene aromatic polymer and the soft metal is indium; an alloy of about 55 percent tin, about 35 percent bismuth, and about 10 percent silver; an alloy of about 50 percent zinc and about 50 percent cadmium; an alloy of about 80 percent tin, about 15 percent bismuth and about 5 percent copper; an alloy of about 75 percent tin, about 20 percent bismuth and about 5 percent silver; an alloy of about 75 percent tin and about 25 percent silver; an alloy of about 75 percent tin and about 25 percent lead; or an alloy of about 50 percent tin, about 30 percent bismuth and about 20 percent copper, said percentage being by weight.

3. A metal/organic polymer composite comprising a normally solid, formable thermoplastic polymer layer and a normally solid, soft metal layer intimately adhered to at least one surface of the polymer layer, said soft metal being a metal alloy comprising at least 50 weight percent of a first metal and at least 5 weight percent of a second metal, both of said metals having melting points below 450° C. (723° K.), said alloy melting at a temperature or over a range of temperatures that is from about 80 to about 135 percent of the forming temperature of the thermoplastic polymer, said temperatures being in °K.

4. The composite of claim 3 wherein the metal alloy also contains at least 0.1 weight percent of a metal having a melting point above 450° C. (723° K.).

5. The composite of claim 1 wherein the liquidus temperature and the solidus temperature of the soft metal are within the range from about 0.85 $T_f$ to about 1.35 $T_f$, wherein $T_f$ is the temperature used in forming the composite.

6. A metal/organic polymer composite comprising a normally solid, formable thermoplastic polymer layer and a normally solid soft metal layer intimately adhered to at least one surface of the polymer layer, said soft metal being a metal alloy having a solidus temperature less than 650° K. and containing at least 60 weight percent of at least one of indium, bismuth, tin, zinc, cadmium, antimony and lead and not more than 95 weight percent of any one metal.

7. The composite of claim 6 wherein the alloy does not contain more than 90 weight percent of any one metal.

8. The composite of claim 6 wherein the alloy does not contain more than 80 weight percent of any one metal and has a solidus temperature less than 548° K.

9. A metal/organic polymer composite comprising a normally solid, formable thermoplastic polymer layer and a normally solid, soft metal layer intimately adhered to at least one surface of the polymer layer, said soft metal being a metal alloy comprising from 85 to 98 weight percent of at least one of indium, bismuth, tin, zinc, cadmium, antimony and lead and from 2 to 15 weight percent of copper, silver, gold, nickel, magnesium and aluminum, said alloy melting at a temperature or over a range of temperatures that is from about 80 to about 135 percent of the forming temperature of the thermoplastic polymer, said temperatures being in °K.

10. The composite of claim 5 wherein the polymer is polyethylene of poly(vinylidene chloride) and the soft metal is an alloy containing from about 25 to about 90 weight percent tin, from about 5 to about 75 weight percent of at least one of bismuth, antimony, zinc and lead and up to about 25 weight percent of copper, silver and nickel.

11. The composite of claim 6 wherein the metal layer has a thickness in the range from about 0.01 to 1 micrometer.

12. The composite of claim 10 wherein a polymer layer is adherent to each of the sides of the metal layer.

13. A metal/organic polymer composite comprising a metal layer of the alloy of from about 25 to about 90 weight percent tin, from about 8 to about 60 weight percent bismuth and from about 1 to about 25 weight percent of at least one of copper, silver, nickel, magnesium, gold, iron, chromium and manganese intimately adhered to at least one surface of a normally solid, formable thermoplastic polymer layer.

* * * * *

UNITED STATES PATENT AND TRADEMARK OFFICE
CERTIFICATE OF CORRECTION

PATENT NO. : 4,211,822
DATED : July 8, 1980
INVENTOR(S) : Virgil B. Kurfman; Raymond E. Gransden, Jr.

It is certified that error appears in the above-identified patent and that said Letters Patent are hereby corrected as shown below:

Column 3, line 4, delete "were" and insert --when--.
Column 4, line 7, delete "scraples" and insert --scrapless--.
Column 5, line 5, delete the second occurring "of" and insert --or--.
Column 6, line 3, delete "and" (1st occurrence) insert -- the --
Column 6, line 15, delete "alloys" and insert --alloy--.
Column 6, line 23, delete "tine" and insert --tin--.
Column 7, line 68, delete "methyacrylate" and insert --methacrylate--.
Column 10, line 25, before "5" insert --a--.
Column 11, line 64, delete "<450°C." and insert -->450°C.--.
Column 11, line 64, delete "<723°K." and insert -->723°K.--.
Column 16, line 20, delete "of" and insert --or--.

Signed and Sealed this

Ninth Day of December 1980

[SEAL]

Attest:

SIDNEY A. DIAMOND

Attesting Officer

Commissioner of Patents and Trademarks